(12) United States Patent
Carlson

(10) Patent No.: US 10,066,349 B2
(45) Date of Patent: Sep. 4, 2018

(54) HIGHLY VISIBLE COLORED PAVEMENT TREATMENTS

(71) Applicant: The Texas A&M University System, College Station, TX (US)

(72) Inventor: Paul John Carlson, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 15/030,213

(22) PCT Filed: Oct. 17, 2014

(86) PCT No.: PCT/US2014/061163
§ 371 (c)(1),
(2) Date: Apr. 18, 2016

(87) PCT Pub. No.: WO2015/058098
PCT Pub. Date: Apr. 23, 2015

(65) Prior Publication Data
US 2016/0258122 A1  Sep. 8, 2016

Related U.S. Application Data

(60) Provisional application No. 61/892,008, filed on Oct. 17, 2013.

(51) Int. Cl.
*E01F 9/506* (2016.01)
*E01F 9/518* (2016.01)
(Continued)

(52) U.S. Cl.
CPC .............. *E01F 9/518* (2016.02); *C09D 5/22* (2013.01); *C09K 11/02* (2013.01); *C09K 11/08* (2013.01);
(Continued)

(58) Field of Classification Search
CPC ............ E01C 7/35; E01C 17/00; E01F 9/506
(Continued)

(56) References Cited

U.S. PATENT DOCUMENTS 3,291,011 A * 12/1966 DeFregger .............. E01F 9/506
106/284.01
3,935,365 A * 1/1976 Eigenmann ............ G02B 5/128
428/213
(Continued)

FOREIGN PATENT DOCUMENTS

GB  2505017  *  2/2014
GB  2510009  *  7/2014
(Continued)

OTHER PUBLICATIONS

International Search Report and Written Opinion for International Application No. PCT/US2014/061163 dated Mar. 18, 2015.

*Primary Examiner* — Gary S Hartmann
(74) *Attorney, Agent, or Firm* — Tumey L.L.P.

(57) ABSTRACT

Composite and methods are applied to the surface as a highly visible colored pavement treatment. In an embodiment, a highly visible colored pavement treatment comprises an aggregate material, an enhanced visibility material, and wherein the enhanced visibility material is mixed with and blended into the aggregate material to form a composite. In another embodiment, the method of applying the highly visible colored pavement treatment to a surface may comprise applying an adhesive to a target area, applying enhanced visibility material to the target area, and applying an aggregate material to the target area.

19 Claims, 2 Drawing Sheets

(51) Int. Cl.
*C09K 11/02* (2006.01)
*C09K 11/08* (2006.01)
*E01F 9/524* (2016.01)
*C09D 5/22* (2006.01)
*E01C 9/00* (2006.01)
*E01C 11/24* (2006.01)
*E01C 15/00* (2006.01)
*E01C 17/00* (2006.01)
*E01C 7/35* (2006.01)

(52) U.S. Cl.
CPC .............. *E01C 9/001* (2013.01); *E01C 11/24* (2013.01); *E01C 15/00* (2013.01); *E01C 17/00* (2013.01); *E01F 9/506* (2016.02); *E01F 9/524* (2016.02); *E01C 7/35* (2013.01)

(58) Field of Classification Search
USPC .................. 404/17, 19, 22, 71; 427/137
See application file for complete search history.

(56) References Cited

U.S. PATENT DOCUMENTS

| | | | | |
|---|---|---|---|---|
| 3,958,891 A | * | 5/1976 | Eigenmann | E01C 7/35 359/536 |
| 4,020,211 A | * | 4/1977 | Eigenmann | B29C 70/64 359/540 |
| 4,080,228 A | * | 3/1978 | Currigan | E01C 23/082 156/247 |
| 4,183,536 A | * | 1/1980 | Platt | A63B 67/14 273/DIG. 8 |
| 4,328,274 A | * | 5/1982 | Tarbutton | A63C 17/01 428/142 |
| 4,595,599 A | * | 6/1986 | Brown | C04B 41/009 252/301.16 |
| 5,380,549 A | * | 1/1995 | Harvison | B05D 5/02 404/14 |
| 5,395,673 A | * | 3/1995 | Hunt | B05D 5/02 404/14 |
| 5,456,546 A | * | 10/1995 | Bollag | E01C 7/35 404/14 |
| 5,472,737 A | * | 12/1995 | Anders | C09D 5/004 252/301.36 |
| 5,770,299 A | * | 6/1998 | Dannenhauer | C09D 5/36 106/266 |
| 5,897,914 A | * | 4/1999 | DePriest | B05D 5/063 427/137 |
| 5,925,287 A | * | 7/1999 | Mathiasson | C09D 5/22 106/31.04 |
| 6,136,226 A | | 10/2000 | Sakai | |
| 6,146,548 A | | 11/2000 | Sakai | |
| 6,225,371 B1 | * | 5/2001 | Prerre | C04B 14/22 106/281.1 |
| 6,309,562 B1 | | 10/2001 | Sakai et al. | |
| 7,204,658 B2 | * | 4/2007 | Saito | C09D 5/004 252/301.36 |
| 7,252,786 B2 | | 8/2007 | Alfonso et al. | |
| 2004/0137266 A1 | | 7/2004 | Saito | |
| 2005/0160637 A1 | * | 7/2005 | Hesse | G09F 13/20 40/124.5 |
| 2006/0038161 A1 | | 2/2006 | Alfonso et al. | |
| 2009/0262514 A1 | | 10/2009 | Struley | |
| 2010/0283007 A1 | | 11/2010 | Robinson | |

FOREIGN PATENT DOCUMENTS

| | | | |
|---|---|---|---|
| JP | 8-119706 | * | 5/1996 |
| JP | 10-105100 | * | 4/1998 |
| JP | 10-219621 | * | 8/1998 |
| JP | 2003-253607 | * | 10/2003 |
| JP | 2006-83680 | * | 3/2006 |

* cited by examiner

HIGHLY VISIBLE COLORED PAVEMENT TREATMENTS

BACKGROUND OF THE INVENTION

Field of the Invention

The present embodiments relate to pavement treatments, and more particularly, to enhanced visibility pavement treatments and methods of producing enhanced visibility pavement treatments.

Background of the Invention

Roadway features and lane designations are increasingly distinguished through the use of colored paving materials. These paving materials may mark a portion of or the entirety of the road or lane. For example, in many municipalities, the color green may be used to designate a bike lane. The purpose of this designation is to warn drivers against traversing the lane or parking in the lane.

At night, it may become difficult or even impossible to detect the colored paving materials without adequate lighting. In areas where such lighting is not installed or may be difficult to install, colored pavement may lose most of, if not all of its functionality. A similar result may occur during the day at times when visibility is impaired due to weather, and the like.

Previous attempts to solve this issue have included the use of retroreflective materials. However, the use of retroreflective materials may reduce the coefficient of friction between the pavement and the rubber of the tires. This reduction may create a driving surface that provides less than sufficient friction; furthermore, the surface may be unsuitable for some or even all vehicles.

Consequently, there is a need for enhanced visibility colored paving materials.

BRIEF SUMMARY OF SOME OF THE PREFERRED EMBODIMENTS

These and other needs in the art are addressed in one embodiment by a composition comprising a combination of aggregate materials and enhanced visibility materials to enhance nighttime visibility of at least a portion of the paving material. The composition comprises aggregate materials mixed with ground or unground enhanced visibility materials to produce a highly visible colored pavement treatment. Enhanced visibility materials include any photoluminescent material, chemiluminescent material, or combination thereof. The enhanced visibility paving material allows drivers and/or pedestrians to detect the colored pavement during nighttime conditions, with a color similar to that of the daytime color. In embodiments, this is achieved by enhancing the colored pavement with the materials that produce a similar color of light that is observed under daytime conditions.

An additional embodiment comprises a method for producing a composition comprising a combination of aggregate materials and enhanced visibility materials. The method may comprise grinding the enhanced visibility materials until the enhanced visibility materials are of the same average particle size as the aggregate materials comprising the paving materials. Optionally, the materials may be unground. The method further comprises mixing the aggregate materials with the enhanced visibility materials to produce a highly visible colored pavement treatment.

In embodiments, a highly visible colored pavement treatment may comprise a rough aggregate material and an enhanced visibility material that emits light. Furthermore, the highly visible colored pavement treatment may be applied to a surface by applying an adhesive to a target area, applying enhanced visibility material to the target area, and applying an aggregate material 10 to target area 35.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the disclosure, reference will now be made to the accompanying drawings in which.

DETAILED DESCRIPTION OF THE PREFERRED EMBODIMENTS

Figure 1:
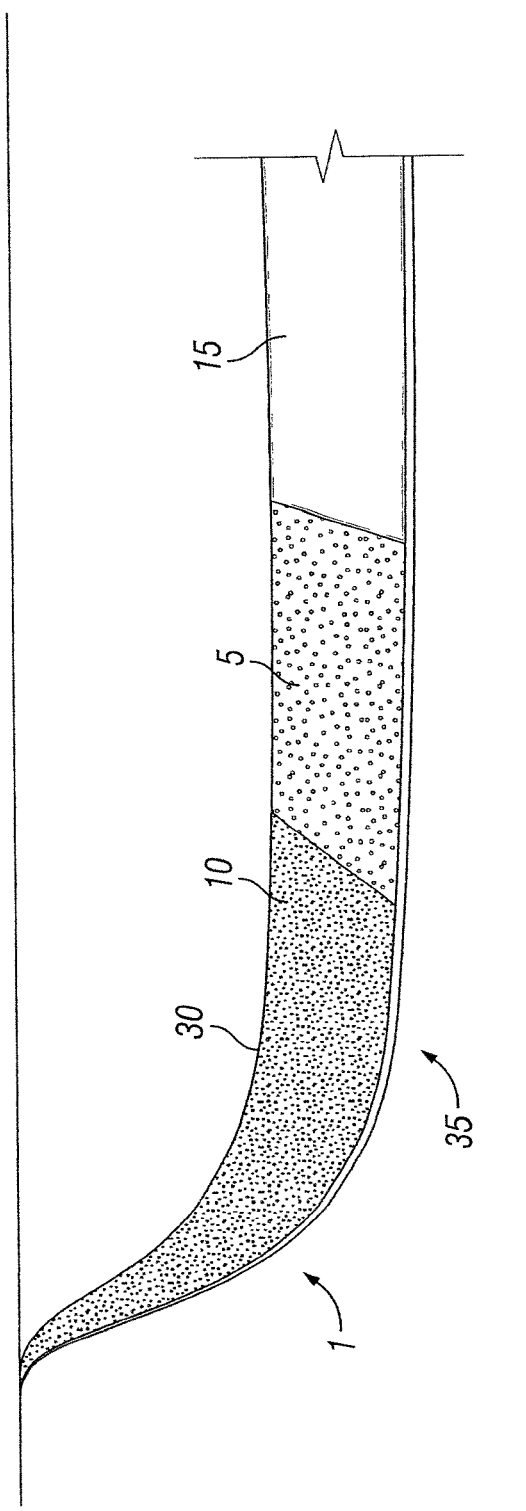
FIG. 1 illustrates a surface, wherein a target area has an application of an adhesive with enhanced visibility materials and aggregate materials embedded within the adhesive.

Using a highly visible colored pavement treatment 1 may benefit any user during the day, in low light situations, and at night. Highly visible colored pavement treatments 1 may comprise aggregate materials 10 and enhanced visibility materials 5. During the day, aggregate materials 10 may be visible to a user, wherein visibility during the day may be defined as the time the sun emits visible light across the atmosphere. Light emitted by the sun during the day may range from about one to about twenty four hours, about five to about eighteen hours, about eight to about twelve hours, about eight to about twelve hours, or about one to about four hours. At night, enhanced visibility materials 5 may emit light in the same color as aggregate material 10, wherein at night may be defined as the period of time in which light emitted from the sun is not visible. Night, or absence of visible light emitted from the sun, may range from about one to about twenty four hours, about five to about eighteen hours, about eight to about twelve hours, about eight to about twelve hours, or about one to about four hours. The use of aggregate material 10 and enhanced visibility material 5 may allow a user to see the same color during the day and night. Furthermore, aggregate materials 10 may have a rough surface. In embodiments, the rough surface may be coarse and jagged. Without limitations, such rough surfaces may allow the aggregate material 10 to provide additional friction to surface 30. The increased friction may provide notice to a user. For instance, the notice may be to notify the user that they may be passing between different marked areas, which are marked by highly visible colored pavement treatment 1. An example of such means may be using highly visible colored pavement treatment 1 on lines that separate a bike lane from a car lane. The additional friction may notify a bike user or car user that they are moving into different designated areas. In addition, the increased friction allows constant contact between tires and highly visible colored pavement treatment 1.

In embodiments, highly visible colored pavement treatments 1 may be used indoors. As used outside, highly visible colored pavement treatment 1 may designate areas or lead users to certain areas. With embodiments of indoor use, aggregate material 10 may be smoother than and not as coarse as embodiments of aggregate material 10 in outdoor use. This may prevent unsuspecting travelers from injuries due to higher friction pathways. An example of use may be in a mall, where shopping patrons may see aggregate material 10 that points to exits. In an emergency, where the lights shut off, enhanced visibility materials 5 may emit light, allowing a shopping patron to see the same exit signs they normally see with aggregate materials 10.

Figure 2:
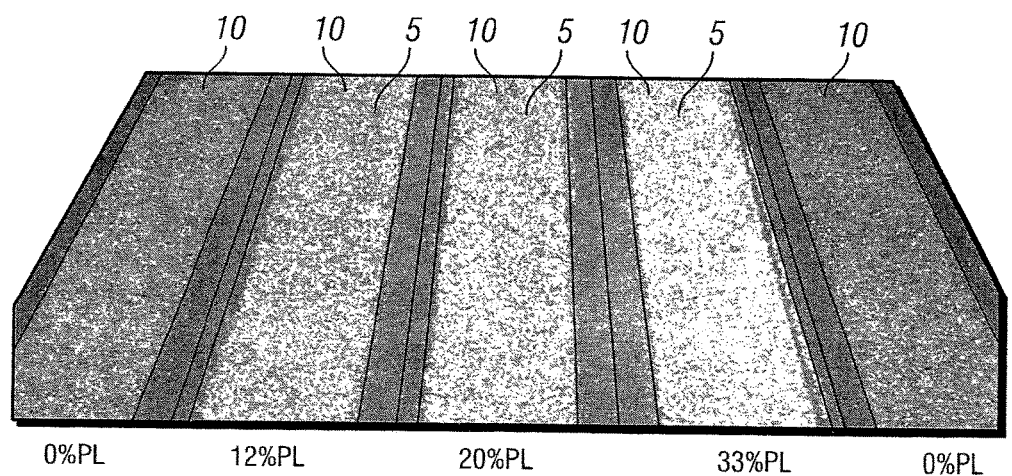
FIG. 2 illustrates five different combinations of enhanced visibility materials and aggregate materials viewed in daylight conditions.

Aggregate materials 10, as illustrated in FIGS. 1 and 2, may refer to different types of paving material, which may be used to create or make a paved surface. Examples of paving material may include, but are not limited to, asphalt, concrete, asphalt concrete, bituminous asphalt concrete, gravel, calcium bauxite, flint, basalt, glass, and the like, or any combinations thereof. In embodiments, the paving material may be colored. The color may result from the use of colored paving materials and/or painting or treating aggregate materials 10 with a color treatment. Color may include, but is not limited to green, blue, black, red, purple, yellow, orange, white, and the like, or any combination thereof. Aggregate material 10 may be coarse and jagged, giving the aggregate a high friction surface. This may allow a user to "feel" the difference between the roadway and aggregate material 10. Feel may refer to the user (i.e., driver) feeling a vibration of the vehicle. To properly apply aggregate material 10, it may be ground down into a proper diameter for application. In embodiments, aggregate material 10 may be about one millimeter to about three millimeters, about two millimeters to about four millimeters, or about three millimeters to about five millimeters in diameter. In additional embodiments, aggregate material 10 may be about one millimeter, about two millimeters, about three millimeters, about four millimeters, or about five millimeters in diameter.

Highly visible colored pavement treatments 1 further comprise enhanced visibility materials 5. In some embodiments, enhanced visibility materials 5 are mixed with aggregate materials 10. As illustrated in FIGS. 1 and 2, enhanced visibility materials 5 include photoluminescent materials, chemiluminescent materials, or any combination thereof. Photoluminescent material may refer to any material that emits light after the absorption of photons. Photoluminescent materials that may be suitable for use as enhanced visibility materials 5 comprise phosphors. Phosphors include oxides, nitrides, oxynitrides, sulfides, selenides, halides or silicates of zinc, cadmium, manganese, aluminum, silicon, various rare earth metals, zinc sulfide, and the like, or any combinations thereof. In some embodiments, phosphors may be activated by the use of a dopant, also referred to as an activator. In embodiments, dopants are added to phosphors to create a desired type of nonhomogeneities. Nonhomogeneities provide a material with luminescence properties. In embodiments, dopants comprise copper, silver, europium, cerium, thallium, and the like, or any combination thereof.

In additional embodiments, photoluminescent material may comprise the phosphor strontium oxide aluminate ($SrAl_2O_4$). $SrAl_2O_4$ may be activated by a suitable dopant, for example, Europium (Eu). When activated the $SrAl_2O_4$ is referred to as $SrAl_2O_4$:Eu. Activated phosphors suitable for embodiments may include, but should not be limited to: $SrAl_2O_4$:Eu, SrS:Bi, CaS:Bi, ZnS:Cu, CdS:Cu, $Zn_2SiO_4$:Mn, ZnS:Cu(Ag)(B*), $Zn_5$:$BeSi_5O_{19}$:Mn, ZnS:Ag+(Zn,Cd)S:Ag, ZnS:Ag+ZnS:Cu+$Y_2O_2$S:Eu, ZnO:Zn, KCl, ZnS:Ag,Cl, ZnS:Zn, $Zn(Mg)F_2$:Mn, ZnO:Zn, KF:Mn, $MgF_2$:Mn, (Zn,Cd)S:Ag, $Y_2O_2$S:Eu+$Fe_2O_3$, ZnS:Ag+Co-on-$Al_2O_3$, $(KF,MgF_2)$:Mn, $ZnF_2$:Mn, $Zn_2SiO_4$:Mn,As, ZnS:Ag+(Zn,Cd)S:Cu, $Gd_2O_2$S:Tb, $Y_2O_2$S:Tb, $Y_3Al_5O_{12}$:Ce, $Y_2SiO_5$:Ce, $Y_3Al_5O_{12}$:Tb, $Y_2SiO_5$:Tb, $Y_2OS$:Tb, $Y_3(Al,Ga)_5O_{12}$:Ce, $Y_3(Al,Ga)_5O_{12}$:Tb, $InBO_3$:Tb, $InBO_3$:Eu, $InBO_1$:Tb+$InBO_3$:Eu, $InBO_3$:Tb+$InBO_3$:Eu+ZnS:Ag, (Ba,Eu)$Mg_2Al_{16}O_{27}$, (Ce,Tb)$MgAl_{11}O_{19}$, $BaMgAl_{10}O_{17}$:Eu,Mn, $BaMg_2Al_{16}O_{27}$:Eu(II), $BaMgAl_{10}O_{17}$:Eu,Mn, $BaMg_2Al_{16}O_{27}$:Eu(II),Mn(II), $Ce_{0.67}Tb_{0.33}MgAl_{11}O_{19}$:Ce,Tb, $Zn_2SiO_4$:Mn,$Sb_2O_3$, $CaSiO_3$:Pb,Mn, $CaWO_4$, $CaWO_4$:Pb, $MgWO_4$, $(Sr,Eu,Ba,Ca)_5(PO_4)_3Cl$, $Sr_5Cl(PO_4)_3$:Eu(II), $(Ca,Sr,Ba)_3(PO_4)_2Cl_2$:Eu, $(Sr,Ca,Ba)_{10}(PO_4)_6Cl_2$:Eu, $Sr_2P_2O_7$:Sn(II), $Sr_6P_5BO_{20}$:Eu, $Ca_5F(PO_4)_3$:Sb, $(Ba,Ti)_2P_2O_7$:Ti, $3Sr_3(PO_4)_2SrF_2$:Sb,Mn, $Sr_5F(PO_4)_3$:Sb,Mn, $Sr_5F(PO_4)_3$:Sb,Mn, $LaPO_4$:Ce,Tb, $(La,Ce,Tb)PO_4$, $(La,Ce,Tb)PO_4$:Ce,Tb, $Ca_3(PO_4)_2CaF_2$:Ce,Mn, $(Ca,Zn,Mg)_3(PO_4)_2$:Sn, $(Zn,Sr)_3(PO_4)_2$:Mn, $(Sr,Mg)_3(PO_4)_2$:Sn, $(Sr,Mg)_3(PO_4)_2$:Sn(II), $Ca_5F(PO_4)_3$:Sb,Mn, $Ca_5(F,Cl)(PO_4)_3$:Sb,Mn, $(Y,Eu)_2O_3$, $Y_2O_3$:Eu(III), $Mg_4(F)GeO_6$:Mn, $Mg_4(F)(Ge,Sn)O_6$:Mn, $Y(P,V)O_4$:Eu, $YVO_4$:Eu, $Y_2O_2S$:Eu, $3.5MgO.0.5MgF_2GeO_2$:Mn, $Mg_5As_2O_{11}$:Mn, $SrAl_2O_7$:Pb, $LaMgAl_{11}O_{19}$:Ce, $LaPO_4$:Ce, $SrAl_{12}O_{19}$:Ce, $BaSi_2O_5$:Pb, $SrFB_2O_3$:Eu(II), $SrB_4O_7$:Eu, $Sr_2MgSi_2O_7$:Pb, $MgGa_2O_4$:Mn(II), or any combinations thereof. Although example phosphors may be listed above in an activated form with a suitable dopant, it is to be understood that any dopant capable of activation for an individual phosphor may be used in embodiments. Therefore, it is to be understood that the present embodiments are not to be limited to merely the phosphor: dopant combinations listed above.

Chemiluminescent material refers to any material that emits light during or after a chemical reaction (e.g., a flurophore). Chemiluminescent differs from fluorescence in that the electronic excited state is derived from the product of a chemical reaction rather than the more typical way of creating electronic excited stats, namely absorption. An example chemiluminescent reaction is the reaction of luminol and an oxidizing agent. Examples of chemiluminescent materials suitable for embodiments may include proteins and peptides, small organic compounds, synthetic oligomers and polymers, and also multi-component systems. Specific examples include: Xanthene derivatives: fluorescein, rhodamine, Oregon green, eosin, and Texas red; Cyanine derivatives: cyanine, indocarbocyanine, oxacarbocyanine, thiacarbocyanine, and merocyanine; Naphthalene derivatives (dansyl and prodan derivatives); Coumarin derivatives; oxadiazole derivatives: pyridyloxazole, nitrobenzoxadiazole and benzoxadiazole; Pyrene derivatives: cascade blue, and the like; Oxazine derivatives: Nile red, Nile blue, cresyl violet, oxazine 170, and the like; Acridine derivatives: proflavin, acridine orange, acridine yellow, and the like; Arylmethine derivatives: auramine, crystal violet, malachite green; Tetrapyrrole derivatives: porphin, phthalocyanine, bilirubin; or any combinations thereof.

In embodiments, enhanced visibility materials 5 may be colored. The color may result from the use of colored enhanced visibility materials 5, painting enhanced visibility materials 5 with a color treatment, treating enhanced visibility materials 5 without a color treatment, spray, bath, or any combination thereof. Color may include, but is not limited to green, blue, black, orange, purple, red, yellow, white, and the like, or any combination thereof. Enhanced visibility materials 5 may be coarse and jagged, giving enhanced visibility materials 5 a high friction surface. This may allow a user to "feel" the difference between the roadway and enhanced visibility materials 5. To properly apply enhanced visibility materials 5, it may be ground down into the proper diameter for application. In embodiments, enhanced visibility materials 5 may be about one millimeter to about three millimeters, about two millimeters to about four millimeters, or about three millimeters to about five millimeters in diameter. In additional embodiments, enhanced visibility materials 5 may be about one millimeter, about two millimeters, about three millimeters, about four millimeters, or about five millimeters in diameter.

Figure 3:
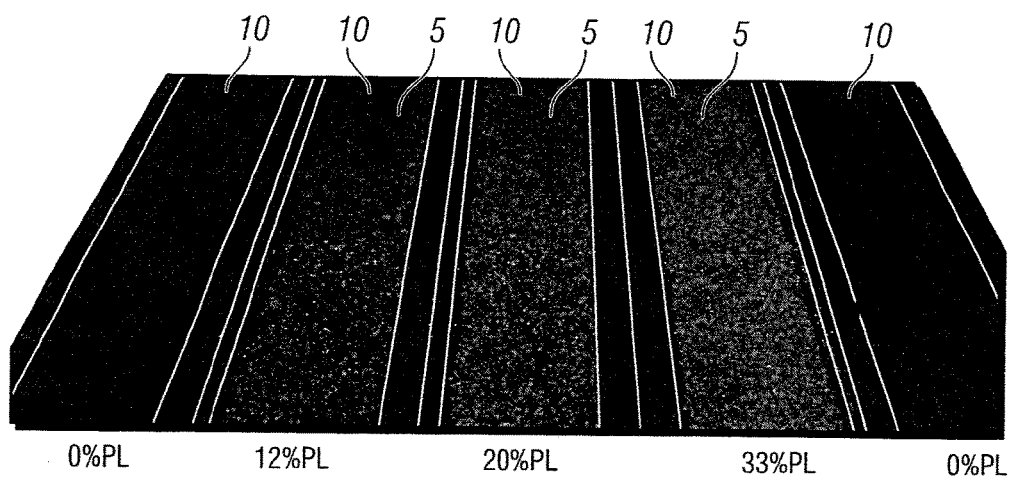
FIG. 3 illustrates five different combinations of enhanced visibility materials and aggregate materials viewed during nighttime conditions.

Both enhanced visibility materials 5 and aggregate materials 10, in embodiments, are approximately the same diameter. However, in additional embodiments, the aggregate material 10 may be larger than enhanced visibility materials 5, or vice versa. As illustrated in FIGS. 2 and 3, applying enhanced visibility materials 5 and aggregate materials 10 to a surface may be accomplished in different ratios. In embodiments, there may be about one part enhanced visibility materials 5 to about every four parts aggregate material 10, about one part enhanced visibility materials 5 to about every six parts aggregate material 10, about one part enhanced visibility materials 5 to about every three to about six parts aggregate material 10, or about one part enhanced visibility materials 5 to about every seven parts aggregate material 10. In additional embodiments, enhanced visibility materials 5 may make up about five percent, about ten percent, about twelve percent, about fifteen percent, about twenty percent, about twenty five percent, about thirty percent, about thirty three percent, about thirty five percent, about forty percent, about forty five percent, about fifty percent, about fifty five percent, about sixty percent, about sixty five percent, about seventy percent, about seventy five percent, about eighty percent, about eighty five percent, about ninety percent, or about ninety five percent of highly visible colored pavement treatment 1. As illustrated in FIG. 3, the greater the ratio of enhanced visibility materials 5 to aggregate material 10, the greater the amount of emitted light is seen in the dark.

Both enhanced visibility materials 5 and aggregate materials 10 may be combined in a method to place highly visible colored pavement 1 on a surface 30. As illustrated in FIG. 1, a surface 30 is identified in which highly visible colored pavement 1 may be applied. Highly visible colored pavement 1 may be applied to create any shape at any length, size, and width. Suitable shapes may be, but are not limited to, lines, circles, ovals, squares, rectangles, and the like, or any combination thereof. Surface 30 is cleaned and prepared for application. A layer of adhesive 15 is placed along the targeted area. Adhesive 15 may be a suitable adhesive for use on a roadway. Embodiments of suitable adhesives may include epoxy adhesive, bituminous adhesive, a butane pad, or any combination thereof. Each adhesive 15 may have different rates and times it takes to solidify based upon external elements. For example, when applying adhesive 15, one of ordinary skill in the art may take into account the weather, drying time required, and foot traffic. Applying the selected adhesive 15 to the surface 30 may allow for enhanced visibility materials 5 to be applied to adhesive 15. In embodiments, enhanced visibility materials 5 are applied before aggregate material 10 due to the high cost of aggregate material 10. Application of enhanced visibility materials 5 may adhere to surface 30 in a ratio of enhanced visibility materials 5 to aggregate material 10, as disclosed above. A proper amount of enhanced visibility materials 5 may be applied to target area 35 based upon the chosen ratio. Early application ensures a tacky adhesive 15 and plenty of target area 35 in which enhanced visibility materials 5 may be applied. This prevents waste of the much more expensive enhanced visibility materials 5. Aggregate material 10 may be applied directly to target area 35 in which enhanced visibility materials 5 is embedded in adhesive 15. Typically, significantly cheaper than enhanced visibility materials 5, aggregate material 10 may be applied in large quantities over target area 35. After adhesive 15 has solidified and cured with enhanced visibility materials 5 and aggregate material 10, excess material may be vacuumed, swept, and/or blown away. This method of application may be accomplished by any suitable means such as, with common painter tools or automation using a vehicle to deliver the material in a controlled manner.

In additional embodiments, a method of application may involve the mixing of enhanced visibility material 5, aggregate material 10 and adhesive 15 before application. In such a method, each component may be kept separate from each other in individual containers such as hoppers before application. At the time of application, a desired ratio of enhanced visibility materials 5 to aggregate material 10 may be combined with adhesive 15 and applied to target area 35.

In embodiments, to assure proper application of the chosen diameter size for both enhanced visibility materials 5 and aggregate material 10, the methods of application may include any such means of reducing or enlarging the size of the enhanced visibility materials 5. Such means may include size exclusion filtration or the addition or removal of size-increasing/size-decreasing functional groups or binding agents to or from the enhanced visibility materials 5. In additional embodiments, highly visible colored pavement treatment 1 may be reduced in diameter until the enhanced visibility materials 5 materials have an average particle size similar to the particle size of the aggregate material 10. Without being limited by theory, highly visible colored pavement treatment 1 having an average particle size similar to the average particle size of the paving material aggregate may provide a highly visible colored pavement treatment 1 without a reduction in the frictional coefficient. Mixing highly visible colored pavement treatment 1 into the paving materials comprises blending highly visible colored pavement treatment 1 with the aggregate of the paving materials such that a composite highly visible colored pavement treatment 1 is produced.

In embodiments, highly visible colored pavement treatment 1 may have an effective product life of about one to ten years, about three to eight years, or about four to seven years. In embodiments, enhanced visibility materials 5 may emit light for about one year to about ten years, about three to eight years, or about four to seven years. In embodiments, the life of emitting light may be about one year, about two years, about three years, about four years, about five years, about six years, about seven years, about eight years, about nine years, or about a ten years.

In embodiments, the enhanced visibility paving material 5 may emit light for a duration of about twelve hours without recharging. For example, enhanced visibility paving material 5 may emit light without recharging for about one to about twelve hours, about two to about ten hours, about four to about eight hours.

After the effective life of the highly visible colored pavement 1, an additional layer of highly visible colored pavement 1 may be applied to the top of the original application of highly visible colored pavement 1. In embodiments, the original application of highly visible colored pavement 1 may be removed from the surface before a new layer of highly visible colored pavement 1 is applied. The original application of highly visible colored pavement 1 may be removed by any suitable means, which may include scrapping, etching means, grinding means, or any combination thereof.

In embodiments, enhanced visibility material 5 may comprise about five percent, about ten percent, about twenty percent, or about thirty eight percent of highly colored pavement treatment 1 by weight. For example enhanced visibility materials 5 may comprise about five percent to about thirty eight percent, about five percent to about twenty percent, about five percent to about ten percent, about ten percent to about thirty eight percent, about ten percent to about twenty percent, or about twenty percent to about thirty eight percent of highly visible colored pavement treatment 1 by weight.

FIG. 2 illustrates five different samples of aggregate material 10 and enhanced visibility material 5. The samples illustrate what a user may see during daylight hours from the mixture of aggregate material 10 and enhanced visibility material 5. The far left sample and far right sample are about one hundred percent aggregate material 10 and about zero percent enhanced visibility material 5. The three middle samples, from left to right, illustrate a sample of about twelve percent enhanced visibility material 5 and about eighty eight percent aggregate material 10, about twenty percent enhanced visibility material 5 and about eighty percent aggregate material 20, and about thirty three percent enhanced visibility material 5 and about sixty seven percent aggregate material 20.

FIG. 3 illustrates five different samples of aggregate material 10 and enhanced visibility material 5. The samples illustrate what a user may see during hours void of daylight, wherein the enhanced visibility material 5 may be emitting light. The far left sample and far right sample are about one hundred percent aggregate material 10 and about zero percent enhanced visibility material 5. The three middle samples, from left to right, illustrate a sample of about twelve percent enhanced visibility material 5 and about eighty eight percent aggregate material 10, about twenty percent enhanced visibility material 5 and about eighty percent aggregate material 20, and about thirty three percent enhanced visibility material 5 and about sixty seven percent aggregate material 20.

Although the present invention and its advantages have been described in detail, it should be understood that various changes, substitutions and alterations may be made herein without departing from the spirit and scope of the invention as defined by the appended claims.

What is claimed is:

1. A highly visible colored pavement treatment comprising:
    an aggregate material, wherein the aggregate material comprises at least one paving material, wherein the at least one paving material is not transparent; and
    an enhanced visibility material, wherein the enhanced visibility material emits a light, wherein the aggregate material and the enhanced visibility material have approximately the same particle diameter, and wherein the ratio of the highly visible colored pavement to the aggregate material is from about 1:3 to about 1:6.

2. The highly visible colored pavement treatment of claim 1, wherein the enhanced visibility material is a chemiluminescent material.

3. The highly visible colored pavement treatment of claim 1, wherein the enhanced visibility material is a photoluminescent material.

4. The highly visible colored pavement treatment of claim 3, wherein the enhanced visibility material has a diameter of about one millimeter to about three millimeters.

5. The highly visible colored pavement treatment of claim 1, wherein the enhanced visibility material comprises about twenty percent of the composite.

6. The highly visible colored pavement treatment of claim 1, wherein the enhanced visibility material comprises about five percent to about twenty percent of the weight of the composite.

7. The highly visible colored composite of claim 3, wherein the light is emitted as the color green.

8. The highly visible colored composite of claim 3, wherein the light is emitted as the color blue.

9. The highly visible colored composite of claim 1, wherein the color of the aggregate material is green or blue.

10. A method of applying a highly visible colored pavement treatment to a surface, comprising:
    applying an adhesive to a target area;
    applying enhanced visibility material that is colored and emits a light to the target area, wherein the surface comprises the target area; and
    applying an aggregate material to the target area, wherein the aggregate material comprises of at least one paving material, wherein the at least one paving material is not transparent, wherein the aggregate material and the enhanced visibility material have approximately the same particle diameter, and wherein the ratio of the highly visible colored pavement to the aggregate material is from about 1:3 to about 1:6.

11. The method of claim 10, further comprising preparing the surface.

12. The method of claim 10, further comprise removing excess aggregate.

13. The method of claim 10, further comprising allowing the adhesive to cure.

14. The method of claim 10, wherein the enhanced visibility material is a chemiluminescent material.

15. The method of claim 10, wherein the enhanced visibility material is a photoluminescent material.

16. The method of claim 10, wherein the enhanced visibility material has a diameter of about one millimeter to about three millimeters.

17. The method of claim 10, wherein the aggregate material has a diameter of about one millimeter to about three millimeters.

18. The method of claim 10, wherein the aggregate material comprises a rough surface.

19. The method of claim 10, wherein the enhanced visibility material has a diameter of 5 millimeters.

* * * * *